May 12, 1964 F. H. GARDNER ETAL 3,132,767
COMPRESSIBLE FLUID METERING APPARATUS
Filed Aug. 17, 1961 2 Sheets-Sheet 1

INVENTORS
FREDERICK H. GARDNER
ROBERT E. SMITH
BY *Allan Rothenberg*

ATTORNEY

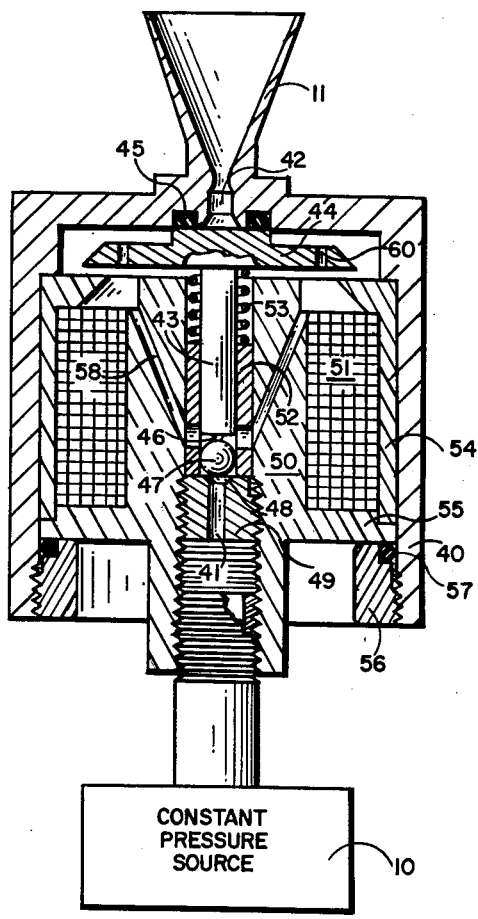
FIG. 2
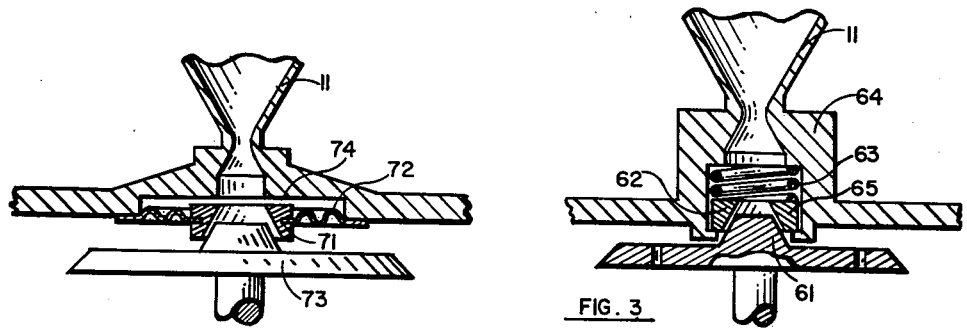
FIG. 4
FIG. 3
INVENTORS
FREDERICK H. GARDNER
ROBERT E. SMITH
BY
Allan Rothenberg
ATTORNEY

United States Patent Office 3,132,767
Patented May 12, 1964

3,132,767
COMPRESSIBLE FLUID METERING APPARATUS
Frederick H. Gardner, Long Beach, and Robert E. Smith, Downey, Calif., assignors to North American Aviation, Inc.
Filed Aug. 17, 1961, Ser. No. 132,033
17 Claims. (Cl. 222—3)

This invention relates to apparatus for providing a controlled flow of a compressible fluid and more particularly concerns an arrangement of such apparatus uniquely adapted for operation under digital control.

It will be readily appreciated that there are numerous applications which would benefit from the use of a precisely and digitally controlled metering of the flow of a gaseous fluid. However, in order to explain the principles of the invention, there will be partically described several embodiments thereof which are peculiarly adapted for application to control of space vehicles.

The control of space vehicles includes as an important element the problem of attitude stabilization which is necessary whenever some portions of a useful load are to be maintained in a desired orientation. Examples of such useful loads are radars, atmosphere samplers, orbit station-keeping controls, solar cell power sources, and optical devices such as telescopes, cameras, infrared scanners, sun trackers, and the like. Control system devised to accomplish the attitude control function usually employ the reaction principle where the momentum force developed by expelling a mass of fluid, which is usually a gas, at some velocity reacts with equal and opposite force on the vehicle body. If a vector of a force is displaced from the vehicle center of mass, a torque results due to the existing moment arm. By a judicious placement of the expulsion points, torques can be generated to effect attitude control and stabilization. This principle has been suggested as suitable for removing separation transients that might induce tumbling in a satellite and also for removing transients of a larger size produced by impact with foreign objects or by expulsion of mass components. It is also suitable for desaturation of an inertia wheel that might be used for a fine vernier control.

Digital computers are becoming of increasingly greater significance in the mechanization of complex systems. In these applications, it is common to handle all control computations in the digital computer as well as the numerous other functions it performs. To achieve optimum system integration, it is desirable to eliminate wherever possible signal conversions whether analog to digital, binary to binary coded decimal, binary to pulse train, etc. The elimination of such conversions is most effectively and simply achieved by employing input-output devices that may be applied directly to and from a digital computer or employing devices which at least have a pulse or a state change type of characteristic that is compatible with digital techniques. The fluid metering apparatus of the present invention is particularly adapted to be receptive to current pulses in train.

In the past, attitude control of satellites has been achieved by proportional control or in the alternative by the cruder full-control concept. In the proportional system, the fluid flow rate to the thrust nozzle is modulated in proportion to the error or error rate. This system is not suitable for long lifetime applications because of its inefficient utilization of the propellant energy. The full-control system turns the fluid jets on with full flow whenever error or error rate exceed certain established values. In general this operation reverses the drift rate and when the vehicle attitude reaches a certain position the jet is turned off. However, an error rate will persist causing the error to build up again in the opposite direction. Thus in this arrangement oscillatory control results. Accordingly, an object of this invention is to provide an improved attitude control system which employs digitally controlled increments or metered increments of fluid flow.

The fluid flow control devices described herein are arranged to be receptive to trains of current pulses. The apparatus develops an increment of fluid discharge that produces a pulse of energy as a thrust-time product. For each control current pulse, there is provided the discharge of an increment of a compressible fluid of a predetermined fixed volume under constant pressure. Since the pressure remains constant and the volume of discharged fluid remains constant, each increment of discharge fluid will be equal to each other increment provided the temperature also remains constant. Accordingly, the devices of this invention can be operated directly by the output of a computer wherein the signal format is a series of pulses delivered therefrom.

With the incorporation in an attitude control system of a reaction jet device that produces a fixed increment of energy with each current pulse it receives, it is possible to improve the efficiency of utilization of the stored energy. For example, an attitude sensor may determine static error and a rate gyro can determine dynamic error (e.g., angular rate) as well known in the are. These static and dynamic error signals are processed by the digital computer to determine, in terms of the moment increment of the jet reaction device, the number of pulses required to arrest the drift rate or to restore the attitude to within the design error threshold. The advantage of such a system is most pronounced in long-life satellite applications. It is also effective in permitting tighter control of the boundary between reaction wheel and fluid jet modes of a hybrid system.

In carrying out the principles of this invention, in accordance with a preferred embodiment, a digital valve is provided having a measuring chamber with inlet and outlet ports and means for closing the outlet port and opening the inlet port. The port closing and opening means includes a control device which comprises a variable length valve assembly having first and second valve elements which cooperate with the respective ports. The variable length of valve assembly comprises a significant aspect of the invention. It provides an arrangement whereby the outlet port may be normally closed and the inlet port just barely opened. Upon energization of the valve by means of one pulse of a train of pulses the inlet port will be closed just before the outlet port is opened with the outlet port proceeding to open subsequent to closing of the inlet port by contraction of the valve assembly.

In one embodiment of the invention, the device of self-recycling in that there is provided means responsive to discharge of fluid from the valve for changing the length of the variable length valve assembly so as to cause the outlet port to be closed when the fixed increment of fluid is discharged through the outlet port.

A novel valve assembly operating mechanism is provided for the digital fluid flow controlled valve in the use of a type of magnetic detent arrangement which involves a permanent magnet and a soft iron armature moveable between the poles thereof but spaced from each pole by a resilient member which prevents the establishment of excessive magnetic attraction forces which would otherwise be due to a substantially decreased gap length.

Thus an object of this invention is to provide an improved digitally controlled fluid metering device.

Another object of the invention is to effect a flow of fluid in discrete increments of mutally equal energies.

Still another object of the invention is to provide a digital control of a fluid.

A further object of the invention is to provide a digitally operable reaction controlled device.

A still further object of the invention is to provide an automatically recycling digitally controlled fluid metering device.

These and other objects of the invention will become apparent from the following description taken in connection with the accompanying drawings in which:

FIG. 2 illustrates a modification of the apparatus of FIG. 1;

FIGS. 3 and 4 illustrate alternate forms of outlet seal; and,

In the drawings like reference numerals refer to like parts.

Figure 1:
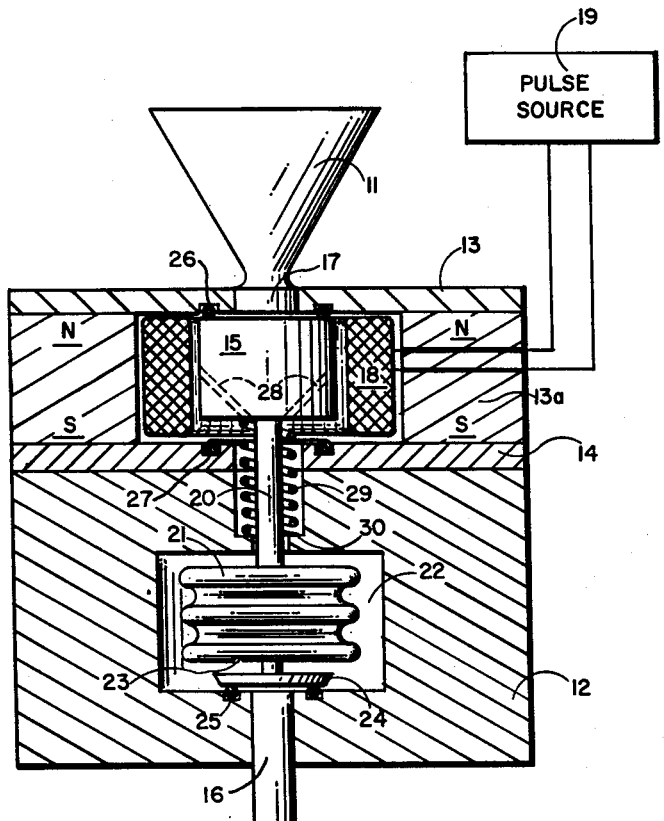
FIG. 1 illustrates an embodiment of the principles of the invention as applied to a self-recycling digitally-controlled reaction jet.

In the embodiment illustrated in FIG. 1 the apparatus is designed to feed a controlled number of precisely equal fixed energy content pulses of a fluid from a source of constant fluid pressure 10 to an expulsion nozzle such as the reaction jet nozzle 11. To this end the digital control valve constructed according to the principles of this invention is interposed between the output of the constant pressure source 10 and the input to the nozzle 11.

The metering apparatus of this embodiment of the invention includes a valve body or casing 12 having at one end thereof a permanent magnet including north and south pole pieces 13, 14 respectively between which is mounted a soft iron armature 15 which drives the variable length valve assembly. Pole pieces 13 and 14 are securely affixed to an annular magnetic body 13a.

The valve body contains a measuring chamber which communicates with the constant pressure source 10 by means of an input port 16 and with the nozzle 11 by means of an output port 17. Within the upper portion of the chamber is mounted an operating coil 18 adapted to receive pulses of current from a train of digital pulses such as is provided by digital pulse source 19. The winding is so poled with respect to the polarity of the current pulses fed thereto that upon energization the soft iron armature 15 is pulled downwardly to be attracted to and captured by the south pole 14 of the permanent magnet.

The valve assembly includes a valve stem 20 secured at one end thereof to the armature 15 and having a flexible bellows 21 secured thereto within a portion 22 of the measuring chamber. The bellows which is vented to the chamber portion 22 by means of an aperture 23 carries at the lower end thereof a valve element in the form of a plate 24 which cooperates with a resilient O-ring 25 carried by the valve body 12 to effect closure of the input port 16.

The upper portion of the measuring chamber in which the armature 15 is mounted also has a pair of O-rings 26 and 27 respectively carried by the north and south pole pieces 13 and 14 of the permanent magnet. The upper O-ring 26 cooperates with the upper surface of the armature 15 to effect closure of the outlet port 17 when the armature is captured by the north pole piece 13. It is to be noted that this O-ring 26 provides both a resilient sealing function and a spacing of the armature from the pole piece by which it is captured, thus considerably decreasing the force required to shift the armature from the pole piece 13. Similarly resilient O-ring 27 provides for a spacing of the armature from the south pole piece 14 when the armature is captured by the latter, thus minimizing the force required to break the armature loose from the south pole piece 14. The armature contains a number of fluid conduits 28 for allowing passage of the fluid within the chamber to the output port 17 when the armature is in its lower position, captured by pole piece 14. There is provided a spring 29 mounted between the armature and a shoulder 30 formed in the valve body for the purpose of assisting closing of the outlet port and shifting of the entire valve assembly to its quiescent position wherein the outlet port is closed and the inlet port is open.

In its quiescent or closed position, the valve assembly is positioned substantially as illustrated wherein the upper surface of armature 15 cooperates with O-ring 26 to close the outlet port 17 while the valve plate 24 is just barely open to allow pressure from a source 10 to fill the chamber including the portion 22 and all portions within the valve body surrounding the valve assembly and its armature. It will be noted that, since in the contemplated satellite application of the system the reaction jet 11 is vented to space, the line pressure from source 10 which acts against the valve assembly provides a pressure difference which will assist the closing of the outlet port 17. Also acting to close this outlet port are the normal resilience of the bellows 21 and the action of the spring 29. In quiescent state the measuring chamber within the valve is charged to line pressure. This feature has two important advantages. First there is less lag in thrust build-up because it is not necessary to first charge the measuring chamber before the metered volume can be exhausted. Secondly, the leakage is decreased by reason of substantially closed inlet and actually closed exhaust valves in the quiescent state. The armature 15 is captured by pole piece 13 and fluid from the source fills the chamber.

The variable length valve assembly is made so that its free length in this quiescent state (e.g., with zero pressure differential across the bellows) causes the valve plate 24 to just barely contact the O-ring 25. The line pressure from source 10 acting against the valve plate 24 thus can open the inlet valve by slightly compressing the bellows and fluid will accordingly fill the chamber. This action is assisted by the bellows 21 because the orifice 23 therein which permits the pressure to eventually equalize will initially restrict the high pressure fluid flowing into the interior of the bellows temporarily so that the higher pressure external to the bellows will induce further collapsing thereof to further open the inlet port. Accordingly, when the chamber is completely filled with fluid at line pressure the valve plate 24 will be in contact with the O-ring 25 and the pressure will be equal both inside and outside the bellows.

Initiation of the operating cycle is achieved by a pulse from source 19 of short duration (substantially less than one full valve cycle) which is of such a polarity as to produce a magnetic field by means of coil 18 which will overcome the attraction of north pole 13 for the armature 15 and furthermore actually move the armature 15 together with the valve stem 20 to a position in the proximity of the south pole 14 where the armature 15 may be captured by this pole and cushioned and spaced from the pole by means of the O-ring 27. This action compresses the bellows, forcing valve plate 24 firmly against the O-ring 25 to close the inlet port. Further compression of the bellows 21 together with the spring 29 opens the outlet port 17 and allows all of the fluid within the measuring chamber to escape via the nozzle 11.

It will be noted that in the quiescent state the outlet port is firmly closed by the armature 15 seated against the O-ring 26 while the inlet port is barely opened by valve plate 24 and O-ring 25 to equalize the pressure in the chamber 22 with the pressure from the source 10. It is to be noted further that upon initiation of the operating cycle the initial motion of the armature downwardly away from the pole 13 does not immediately open the outlet port 17 since the O-ring 26, which is compressed in the quiescent state, expands during the first portion of the armature motion to maintain the outlet port closed. This outlet port is maintained closed for a very short time after the inlet port 16 is closed by an increased firm contact between valve plate and O-ring 25. Thus when the inlet port is closed and valve plate 24 can no longer move downwardly, having compressed O-ring 25, the variable length valve assembly begins to change its length. This contraction of the valve assembly is actually the action which opens the outlet port 17. Contraction of the valve assembly occurs upon compression of the bellows 21 and compression of the O-ring 25.

As the outlet port 17 is opened and armature 15 is captured by the south pole 14 and cushioned against O-ring 27, fluid pressure escapes through conduits 28 to the space outside of the nozzle. As the fluid is discharged pressure differential across the bellows increases partially aided by the slight compression of the bellows until the force developed by the fluid captured within the bellows exceeds the magnetic attraction between the magnetized moveable armature 15 and the south pole of the permanent magnet. The increase in the pressure differential across the bellows is due to the fact that the escape of line pressure fluid from the measuring chamber external to the bellows proceeds at a much more rapid rate than the escape of fluid from within the bellows to the measuring chamber via orifice 23. Accordingly, when the measuring chamber is discharged through the nozzle 11 the measuring chamber pressure drops rapidly while the pressure within the bellows remains almost at line pressure.

Accordingly, when the pressure differential across the bellows reaches a given value as determined by the amount of fluid discharged from the measuring chamber and the pressure drop therein, the bellows exerts a force which aids the force of the compressed spring 29 to urge the armature 15 upwardly away from the south pole and toward the north pole of the permanent magnet. When the force of attraction which holds the magnet armature 15 to the pole 14 is exceeded by the combination of bellows expansion force and force of spring 29 the moveable armature immediately moves to the other limit of its motion whereby it is captured by the north pole to close the outlet port by bringing the surface of the armature into contact with the O-ring 26. At this time the pressure differential across the bellows 21 is still in a direction such as to cause the bellows to tend to expand and the inlet valve will accordingly remain closed. Now the pressure differential across the bellows will begin to equalize as the relatively high pressure fluid escapes through orifice 23 to the valve chamber externally of the bellows. At this time the bellows relaxes and ceases to exert a force which holds the valve plate 24 against O-ring 25 so that the line pressure from source 10 will open the inlet valve by causing a slight compression of the bellows thereby permitting the apparatus to recharge itself and fill the measuring chamber with fluid from source 10. Thus the apparatus is prepared for the next excitation pulse having recycled itself.

It is to be noted that the recycling is automatic, being determined by the structure and arrangement of the bellows together with the relative pressure externally of nozzle 11 and internally of pressure source 10. Since the apparatus is recycling, it is necessary that the current pulse from pulse source 19 be of a duration less than the period of one full cycle of the digital valve.

Thus it will be seen that the variable length valve assembly has a length in the quiescent state just sufficient to effect closure of both input and output ports; however, it has its valve closing element, the armature 15, securely held in a position to firmly close output valve 17 while the valve plate 24 is held to barely close the input port 16 and thus the bellows 21 may be compressed and the input port 16 opened under line pressure to fill the interior of the measuring chamber. Upon initiation of the valve cycle, the inlet port is first closed and then the valve assembly contracts to open the outlet port. Upon discharge of the fluid from the measuring chamber the valve assembly returns to its quiescent position. The bellows acts to return the variable length valve assembly to its original length in this self-recycling arrangement.

The inlet valve port 16 is still closed when outlet port 17 initially recloses because the force exerted by the expanding bellows is acting against the inlet port seat to force the armature away from the pole 14 of the magnet.

Referring now to FIG. 2, there is illustrated an embodiment of the apparatus of FIG. 1 which is not recycling. In this arrangement, in view of the omission of self-recycling structure, it is necessary that the actuating pulse be of sufficient duration for the pressure in the measuring chamber to decay to some preselected value. Further it is necessary with this arrangement to wait for another interval after the armature returns to normal to permit the measuring chamber to be recharged before the next pulse or else the pulse energy content will be reduced. However it may be noted that the chamber charging time enters into the self-recycling repetition rate of all versions of these compressible fluid pulsers. A feature of the arrangement of FIG. 2 which is shared with that of FIG. 1 is that fluid is not allowed to flow from the inlet port through the measuring chamber to the expansion nozzle during the operating cycle. That is, as in the other embodiment fluid is admitted to the measuring chamber and the inlet port is then closed while the output port is opened so that there is never any direct communication from inlet to outlet ports.

The modification of FIG. 2 includes a valve body 40 having inlet port 41 and outlet port 42 arranged as illustrated for connection with a constant pressure source 10 and an expansion nozzle 11 as described in connection with the embodiment of FIG. 1. The embodiment of FIG. 2 also employs a variable length valve assembly which includes valve stem 43, armature 44, O-ring 45, a valve stem tip 46 at the end of valve stem 43, and a resilient ball 47 which cooperates with a mating seat 48 formed in port 41. Port 41, together with its valve seat 48, is provided by a hollow externally threaded nut 49 which is screwed into the body of the valve 40.

The armature 44 is operated as a conventional traction solenoid under the control of a magnet formed of a core 50 and coil 51 wound about the central portion of the magnet core. The valve stem is located and arranged concentrically with the electromagnet 50, 51 and slides between its closed and open positions in a sleeve 52 fixed to the magnet core 50. A compression spring is mounted between the sleeve 52 and the undersurface of the armature 44. The elements 54 and 55 which together form a magnetic core 50 are held in place within the casing 40 by means of a threaded retainer ring 56 and O-ring seal 57. The internally threaded inlet fitting is made as an integral portion of the core element 55. The latter is provided with conduits 58 which provide for passage of the fluid from the inlet port 41 to the outlet port 42 when armature 44 is retracted to open the outlet port. Additional passages 60 are provided through the armature to eliminate obstruction to fluid flow in the lower voids of the measuring chamber when the armature is in retracted position and the solenoid is activated.

In the quiescent state of the embodiment of FIG. 2, the outlet port 42 is closed by the action of spring 53 together with the pressure of the fluid from pressure source 10 which fills all of the voids within the measuring chamber. It is to be understood of course that in this embodiment as in the previous embodiment the expansion nozzle 11 is adapted to be exhausted to a pressure considerably less than line pressure and in the case of a satellite vehicle, the exhaust is to a vacuum. All of the voids within the measuring chamber are charged by fluid from the supply line which passes through the bore of hollow nut 49 which provides the input port 41. The fluid passes between the valve seat 48 and the ball valve 47 since the latter is not compressed in quiescent state. It is to be noted that the length of the contractile variable length valve assembly including compressible ball 47 and compressible O-ring 45 is such that in quiescent position resilient O-ring 45 is compressed, valve port 42 is closed and ball 47 is uncompressed but essentially filling the space between the armature stem 43 and valve 48 when there is equal pressure on both sides of the inlet port;

that is, when the pressure within the measuring chamber is equal to the pressure of source 10. The hollow nut 49 is adjusted to change the length between input and output ports to give the proper relative length of the variable length valve assembly in quiescent condition. In other words, the nut 49 is adjusted so that the ball will just barely open the input valve when there is a greater pressure from the source than there is within the measuring chamber. The adjustment is such that when the pressure within the chamber is equal to the line pressure from the source 10 the ball valve just closes the input valve port 41.

When solenoid coil 51 is energized by a current pulse the valve assembly including armature 44 and valve stem 43 moves downwardly to be captured by the magnet and the resilient ball 47 is compressed against the valve seat 48 of input port 41. It is to be noted that in the quiescent state the ball 47 was uncompressed but nevertheless touching the seat 48. Accordingly, upon motion of the valve assembly, when the solenoid is activated the input port 41 is closed by initial compression of the contractile ball 47 while the outlet port 42 remains closed for the initial portion of the downward armature travel due to the expansion of initially compressed O-ring 45. Thus the inlet port closes first, sealing the measuring chamber and then the outlet port 42 opens permitting discharge of fluid through the expansion nozzle 11 to space. Since the amount of fluid expelled each time is the same and since the pressure of fluid is the same due to the constant pressure source 10, equal increments of energy are provided by the discharged fluid increments if the temperature does not vary.

As previously noted the solenoid coil 51 must remain energized until all of the voids within the measuring chamber have discharged their contents through the outlet port 42. Thus the pulse of current which energizes the solenoid coil 41 must have a pulse duration equal to the time required for discharge of the measuring chamber to some predetermined value. Further an interval between successive pulses is required for the recharging of the measuring chamber. Upon termination of the solenoid energizing pulse action of spring 53 returns the armature and variable length valve assembly to the position wherein outlet port 42 is closed and O-ring 45 is compressed as previously described in connection with the quiescent state. In initially returning to the quiescent state however, the pressure within the measuring chamber is substantially less than that of the line pressure whereby the ball 47 is slightly compressed to allow the input port 41 to be opened and whereby the measuring chamber may be charged. As previously described, when the measuring chamber is fully charged the pressure on each side of the inlet port is equalized and the inlet port is closed.

Illustrated in FIG. 3 is a modification of the outlet valve sealing of the embodiment of FIG. 2 which is particularly adapted to provide a metal seal which is advantageous for use at higher temperatures. The movable seal which is a part of the variable length valve assembly includes a metallic sliding seal collar 62 which is contacted by an armature portion 61 to provide a metal-to-metal sealing contact. The collar 62 is formed with a precision sliding sealing fit with a portion of the case 64 and is urged downwardly away from nozzle 11 by a spring 63 interposed between the collar 62 and the shoulder on the case 64. In quiescent condition the conical projection on the armature 61 contacts the mating conical portion of the sliding collar 62 and forces it upward by a slight amount against the action of spring 63. When the actuating coil is energized, the movable armature moves downwardly allowing the sliding seal collar 62 to move therewith without breaking the seal between elements 62 and 61 until the seal collar 62 reaches a limit of its downward position as provided by abutment against a lower shoulder 65 formed on the case portion 64. Then the continued downward motion of the armature 61 allows the valve outlet port to open whereby fluid may be discharged through the nozzle 11.

In the embodiment of the outlet seal illustrated in FIG. 3, the use of a sliding fit between the collar 62 and the case 64 introduces a possible leakage path when the valve is closed. This problem may be solved by replacing the spring 63 with a linear expansion bellows having a similar spring rate and which itself provides a seal between elements 62 and 64. However, an alternative embodiment which solves this problem is illustrated in FIG. 4. In this arrangement a movable collar 71 having a conical sealing surface is mounted to the casing of the valve by means of a convoluted diaphragm 72. An armature 73 similar to the armature 61 of FIG. 3, carries an upwardly extending conical projection which extends into and mates with the conical surface of the collar 61 to provide a seal for the valve outlet port. In the quiescent position where the solenoid is unenergized the movable armature 73 forces the seal collar 71 against the surface 74 of the case and forceably closes the measuring chamber, being aided by the confined fluid under pressure within the chamber. Upon actuation of the solenoid, the armature 73 moves downwardly, opening the seal between the two conical surfaces of armature 73 and collar 71. Because of the high internal pressure in the measuring chamber the seal collar 71 will remain for some time against its stop surface 74 until the chamber pressure drops somewhat whereupon the spring action of the convoluted diaphragm 72 will move the seal collar 71 downwardly away from stop surface 74.

Figure 5:
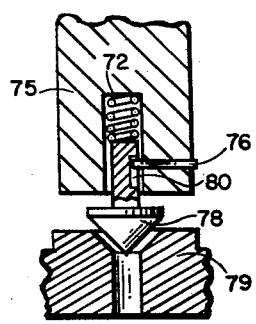
FIG. 5 shows an alternate form of inlet seal.

The embodiment of FIG. 2 may also be modified to provide a metal-to-metal resilient or contractile seal for the inlet port as illustrated in FIG. 5. As illustrated in this figure, the lower end of the valve stem 75 carries a retractible conical sealing member 78 which cooperates with a conical surface formed in the adjustable threaded nut 79 which is analogous to the adjustable nut 49 of FIG. 2. Member 78 is maintained in a sliding engagement within a recess formed in the valve stem 75 by means of a pin 76 engaged within a groove 80 of the valve member 78. A spring 77 is provided between the valve stem 75 and conical valve member 78 largely for the purpose of insuring operation of the device in any attitude regardless of the position of the gravity vector. In quiescent position, fluid pressure from the line source will open the valve forcing valve member 78 upwardly to some extent until the pressure on each side of the inlet port seal is equalized whereupon the length of the valve assembly is such that valve member 78 just barely contacts the mating conical surface of the hollow nut member 79. When the valve stem 75 is moved downwardly (in the illustration) valve member 78 engages the mating surface of nut 79 to close the inlet port.

While the embodiments of FIGS. 3 and 4 have been described in connection with the valve illustrated in FIG. 2, it will be readily appreciated that these outlet seals may also be employed in the arrangement illustrated in FIG. 1. The alternate embodiments of FIGS. 3, 4 and 5 provide for operation at considerably higher temperatures than would be possible with rubber or plastic sealing elements.

There have been described several embodiments of digitally controlled compressible fluid metering devices which embody variable length valve assemblies for opening and closing input and output ports and arranged to prevent straight flow-through from inlet to outlet port. These devices provide equal thrust increments of fixed value for each input control pulse and thus are readily adapted to many digital applications.

Although this invention has been described and illustrated in detail, it is to be clearly understood that the same is by way of illustration and example only, and is not to be taken by way of limitation, the spirit and scope of this invention being limited only by the terms of the appended claims.

We claim:

1. Apparatus comprising a measuring chamber having inlet and outlet ports therefor, control means disposed within said chamber for closing said outlet port and opening said inlet port solely under inlet pressure, for closing the inlet port upon the chamber pressure reaching the inlet pressure, and for selectively opening the outlet port, said control means comprising first and second valve elements cooperating with said inlet and outlet ports respectively and an apertured bellows interconnecting said valve elements.

2. Apparatus having a measuring chamber and inlet and outlet ports therefor, means responsive to an input control signal for opening said outlet port and closing said inlet port whereby fluid under pressure is expelled from said chamber, and means within said chamber responsive to a predetermined pressure in the chamber for closing the outlet port and opening the inlet port.

3. A measuring chamber having inlet and outlet ports, a first valve element operable between first and second positions wherein the inlet port is open and closed respectively, a second valve element operable between first and second position wherein the outlet port is closed and open respectively, means connecting said elements for conjoint operation between said first and second positions thereof, said connecting means including contractile means for causing said first element to close said inlet port before said second element opens said outlet port and for causing said first element to automatically open said inlet port after said second element closes said outlet port, both said inlet and outlet ports being temporarily closed after conjoint operation from said second to said first position and means for effecting said conjoint operation.

4. A measuring chamber having inlet and outlet ports, a variable length valve assembly shiftable between a first position wherein the inlet port is open and the outlet port is closed and a second position wherein the inlet port is closed and the outlet port is open, said valve assembly including contractile means operable upon shifting of the assembly from said first position for causing said inlet port to close before said outlet port opens, and means for automatically holding said inlet port closed temporarily when said outlet port is closed upon shifting of the assembly from said second position to said first position.

5. A fluid measuring chamber having inlet and outlet ports, a variable length valve assembly shiftable between a first position wherein the inlet port is open and the outlet port is closed and a second position wherein the inlet port is closed and the outlet port is open, said valve assembly including contractile means operable upon shifting of the assembly from said first position for causing said inlet port to close before said outlet port opens, and means for recycling the assembly to the first position, said assembly including pressure sensitive means for changing the length of said assembly upon decreased pressure within the chamber so as to close the outlet port when measured fluid has ben discharged through said outlet port.

6. A fluid measuring chamber having inlet and outlet ports, a variable length valve assembly shiftable between a first position wherein the inlet port is open and the outlet port is closed and a second position wherein the inlet port is closed and the outlet port is open, said valve assembly including contactile means operable upon shifting of the assembly from said first position to said second position for causing said inlet port to close before said outlet port opens, said contractile means comprising a resilient O-ring at the outlet port having a compressed condition released by shifting of the assembly to the second position, and means for recycling the assembly to the first position, said assembly including pressure sensitive means for changing the length of said assembly upon decreased pressure within the chamber so as to close the outlet port before the inlet port is opened when measured fluid has been discharged through said outlet port.

7. A compressible fluid metering apparatus comprising a chamber having outlet and inlet ports, a variable length operating assembly having first and second valve elements at respectively opposite ends thereof situated to close and open said outlet and inlet ports respectively when said assembly is in a first position, means for shifting said assembly to a second position wherein said outlet port is opened by said first valve element and said inlet port is closed by said second valve element, said assembly including means responsive to discharge of fluid from said chamber for changing the length of said assembly so as to cause said outlet port to be closed by said first valve element.

8. A metering apparatus comprising a chamber having outlet and inlet ports, a variable length operating assembly having first and second valve elements at respectively opposite ends thereof situated to close and open said outlet and inlet ports respectively, when said assembly is in a first position, means for shifting said assembly to a second position wherein said outlet port is opened by said first valve element and said inlet port is closed by said second valve element, said assembly including an apertured bellows responsive to a predetermined pressure drop within the chamber for changing the length of said assembly so as to cause said outlet port to be closed by said first valve element and allow inlet pressure to subsequently open the inlet valve.

9. Compressible fluid metering apparatus comprising a chamber having inlet and outlet ports; and a shiftable variable length valve assembly for opening and closing said ports, said assembly comprising a valve stem member and first and second elements respectively carried by said valve body and one end of said valve stem and cooperating to open and close said outlet port, one of said elements comprising contractile means providing an increase in length of said assembly upon shifting thereof in a direction to close said outlet port, and resilient means cooperating with said chamber and the other end of said valve stem for opening said inlet port in response to inlet pressure and for closing said inlet port when said outlet port is opened.

10. The apparatus of claim 9 wherein said one element comprises a sealing collar slidably mounted in the chamber and a spring mounted to urge the collar into engagement with the second of said elements.

11. The apparatus of claim 9 wherein said one element comprises a sealing collar, and a convoluted resilient diaphragm mounting the collar to the chamber.

12. Compressible fluid metering apparatus comprising a chamber having inlet and outlet ports; and a shiftable variable length valve assembly for opening and closing said ports, said assembly comprising a valve stem member and first and second elements respectively carried by said chamber and one end of said valve stem and cooperating to conjointly open and close said outlet port, one of said elements comprising a resilient O-ring at said outlet port providing a decrease in length of said assembly upon shifting thereof in a direction to close said outlet port, and means including a resilient ball cooperating with said valve body and the other end of said valve stem for closing and opening said inlet port.

13. Compressible fluid handling apparatus comprising a chamber with outlet and inlet ports therefor, a variable length valve assembly shiftably mounted for motion between a closed position wherein the outlet and inlet ports are open and closed respectively, said assembly comprising a valve stem having means at one end thereof for opening and closing one of said ports, said assembly including first and second elements for closing and opening the other of said ports, said elements being respectively mounted on said valve body and the other end of said stem, one of said elements comprising resilient means which is compressed when said valve assembly is in position to close said other port.

14. Compressible fluid handling apparatus comprising a chamber with outlet and inlet ports therefor; a valve assembly shiftably mounted for motion between first and second positions for opening and closing said ports; and means for operating said assembly comprising a magnet on said body having mutually opposed poles, an armature forming part of said assembly and shiftable between said poles, means for driving the armature toward the poles alternatively for attraction and capture thereby, and means for spacing the armature from the pole by which it is captured.

15. A signal controlled compressible fluid metering apparatus comprising a chamber with inlet and outlet ports, a valve assembly movably mounted within the chamber and comprising a valve stem, an armature of low magnetic reluctance affixed to one end of the stem and having one side thereof positioned at one end of the chamber adjacent to said outlet port, and apertured bellows having one side thereof affixed to the other end of the valve stem, a valve plate secured to the other side of the bellows and positioned adjacent to the inlet port, an O-ring carried by and protruding from a wall of the chamber concentrically of the outlet port for cooperating with said one side of the armature to close the outlet port, an O-ring carried by a wall of the chamber concentrically of the inlet port for cooperating with the valve plate to close the inlet port, a permanent magnet forming a part of said valve body and having first and second poles positioned on opposite sides of the armature, one of said poles forming said first mentioned chamber wall, the other of said poles having an O-ring mounted therein and protruding therefrom to prevent contact between other pole and armature, a compression spring mounted between the valve body and armature for urging the armature toward said one pole, a port in the armature providing fluid communication across the seal afforded by contact of the armature and said last mentioned O-ring, and an electrical coil in the chamber adjacent the armature for urging the armature toward the other of said poles upon energization of the coil with a pulse of electrical energy.

16. An incremental fluid metering device comprising a chamber having outlet and inlet ports, a centrally bored electromagnet in the chamber, an armature mounted for motion in the chamber between the electromagnet and the outlet port, an O-ring mounted in the chamber wall concentric with and adjacent to the outlet port and cooperating with the armature to close the outlet port, a valve stem slidably mounted in the bore of said electromagnet and having one end attached to the armature, a compression spring mounted between the valve body and the armature for urging the armature toward said outlet port, said inlet port comprising a bored member threadedly engaged within the bore of the electromagnet, a resilient ball positioned between the inner end of said bored inlet port member and the other end of the valve stem, said member being adjustably positioned to contact the ball when the outlet port is closed by the armature and the pressure is substantially equal on both sides of the inlet port.

17. An incremental fluid metering device comprising a chamber having outlet and inlet ports, a centrally bored electromagnet in the chamber, an armature mounted for motion in the chamber between the electromagnet and the outlet port and having a conical sealing projection, a sealing collar having a conical sealing surface mating with the armature projection and cooperating with the armature to close the outlet port, a convoluted diaphragm resiliently mounting the collar to the valve body, a valve stem slidably mounted in the bore of said electromagnet and having one end attached to the armature, a compression spring mounted between the valve body and the armature for urging the armature toward said outlet port, said inlet port comprising a bored member threadedly engaged within the bore of the electromagnet and having a conical sealing surface, a conical valve member slidably mounted to said valve stem and positioned between the inner end of said bored inlet port member and the other end of the valve stem for cooperating with said bored member sealing surface to close said inlet port, said member being adjustably positioned to just contact the conical valve member when the outlet port is closed by the armature and the pressure is substantially equal on both sides of the inlet port.

References Cited in the file of this patent

UNITED STATES PATENTS

| | | |
|---|---|---|
| 1,402,604 | Harvey | Jan. 3, 1922 |
| 2,233,818 | Matter | Mar. 4, 1941 |
| 2,380,884 | Von Stoeser et al. | July 31, 1945 |
| 2,527,136 | Kagi et al. | Oct. 24, 1950 |
| 2,723,057 | Golden | Nov. 8, 1955 |
| 2,734,667 | Conklin | Feb. 14, 1956 |
| 2,887,255 | Bauerlein | May 19, 1959 |